United States Patent [19]
Lingard et al.

[11] Patent Number: 5,931,415
[45] Date of Patent: Aug. 3, 1999

[54] PLUG-TYPE OVERWING EMERGENCY EXIT DOOR ASSEMBLY

[75] Inventors: George F.D. Lingard, Bellevue; Donald R. Noble, Issaquah; Michael A. Fleming, Bellevue; Robert A. Kasper, Renton, all of Wash.

[73] Assignee: The Boeing Company, Seattle, Wash.

[21] Appl. No.: 08/853,688

[22] Filed: May 9, 1997

[51] Int. Cl.⁶ ...................................................... B64C 1/14
[52] U.S. Cl. .................................... 244/129.5; 244/129.4; 74/105; 49/386
[58] Field of Search ............................. 244/129.5, 129.4, 244/118.1, 118.3; 49/386, 387; 74/105, 106; 16/287, 288, 289

[56] References Cited

U.S. PATENT DOCUMENTS

| 823,372 | 6/1906 | Stevens et al. . |
|---|---|---|
| 933,070 | 9/1909 | Gleason . |
| 3,263,516 | 8/1966 | Chisholm . |
| 4,473,201 | 9/1984 | Barnes et al. . |
| 4,497,462 | 2/1985 | Hamatani . |
| 4,510,714 | 4/1985 | Kasper et al. . |
| 4,560,123 | 12/1985 | Sealey et al. . |
| 5,031,863 | 7/1991 | Noble . |
| 5,064,147 | 11/1991 | Noble et al. . |

FOREIGN PATENT DOCUMENTS 2357103  5/1975  Germany ........................... 244/129 D

*Primary Examiner*—Charles T. Jordan
*Assistant Examiner*—Tien Dinh
*Attorney, Agent, or Firm*—Christensen O'Connor Johnson & Kindness, PLLC

[57] ABSTRACT

A door assembly for covering an opening (12) formed in the body (26) of an aircraft including a door (10) with two gooseneck hinge arms (28) are rotatably connected at one end to the aircraft body above the door opening and rotatably connected at their other end to the door. An actuator (30) is provided to pivot the hinge arm about its rotatable connection to the body. Two mounting panels (106) are located between the two gooseneck hinge arms. A torque tube (104) is supported by the door and rotates by turning an interior door handle (100) that is located between the two mounting panels. The door assembly further includes a latching assembly (32), hinge guide assembly (34), and frame guide assembly (36) that cooperate to give the door a desired motion. The latching, hinge guide, and frame guide assemblies each include various rollers that engage with tracks. In operation, the torque tube (104) is rotated to cause the door (10) to move from a closed position to an open position in which the shape and orientation of the latching assembly (32), the hinge guide assembly (34), and the frame guide assembly (36) cause the upper edge of the door to initially move inward and downward relative to the body opening (12) while the lower door edge initially moves outward and downward relative to the body opening (12).

18 Claims, 14 Drawing Sheets

PLUG-TYPE OVERWING EMERGENCY EXIT DOOR ASSEMBLY

FIELD OF THE INVENTION

The present invention relates to doors for egress from transport vehicles, and more particularly, to outwardly opening, plug-type emergency exit doors, such as those located over the wing of an aircraft.

BACKGROUND OF THE INVENTION

Overwing emergency exit systems on existing commercial aircraft normally use a plug-type hatch requiring the operation of a single handle to unlatch the hatch. The hatch must then be manually lifted out of its location in the body structure and either placed inside the aircraft or thrown out through the body opening.

Automatically powered systems for opening doors to the exterior of aircraft are known in the art. However, such systems are not generally applicable to overwing emergency exit hatches because their powering and linkage mechanisms can intrude into the passenger headroom area or overhead bin storage area. In an overwing emergency exit door application, the powering and linkage mechanisms must substantially fit within the envelope between the outer skin of the aircraft and the interior cabin liner or storage bins. Additionally, the powering and linkage mechanisms should be configured to allow a standard-sized window to be placed in the central region of the door, since uniformity of appearance is greatly desired by aircraft customers.

An automatically powered outwardly opening emergency exit door is described in U.S. Pat. No. 5,031,863. The '863 device includes a door frame and a pair of hinge arms for providing swinging movement of the door between open and closed positions relative to an overwing aircraft fuselage opening. The door may be moved by initiation of either an interior handle or an exterior handle. Either component is mechanically linked to mechanisms that release the door and allow it to swing open. Various pins and channels are provided to help guide the movement of the door in a manner that causes the door lower edge to initially move upward and inward before moving outward. Once the door lower edge is cleared of the opening and stop pads have cleared their respective stop pads, actuators rotate both the hinge arms and the door outward. The operation of the '863 device is satisfactory, however, it is the opinion of the present inventors that a more intuitive approach may be to use a door assembly having a lower edge that initially moves downward and outward.

As a result, there exists a need for an overwing emergency exit door assembly that automatically opens after being unlatched and has a door motion that moves downward and outward. The ideal door assembly should not violate passenger headroom or overhead storage bin area, and should optimally allow the installation of a standard-sized window. In addition, it is important to arrange the door components such that only a relatively small amount of effort is required to quickly open the door to a canopy position for emergency evacuations. The present invention is directed to fulfilling this need.

SUMMARY OF THE INVENTION

In accordance with aspects of the present invention, a door assembly is provided to cover an overwing opening formed in the body of an aircraft. The door assembly includes a door formed of a number of interconnected structural members including one or more upright mounting panels. Hinge arms are rotatably connected at their proximate ends to the aircraft body above the door opening and are rotatably connected at their distal ends to the door. Preferably, the hinge arms are a pair of gooseneck hinge arms that include an arcuate portion at their proximate ends and a linear portion at their distal ends. Actuators extend between the body and the hinge arms to provide a force on the hinge arms, continuously urging the hinge arms to pivot about their rotatable connection to the body. In preferred embodiments, there are two mounting panels that exist between two hinge arms. The hinge arms are preferably interconnected via an upper shoulder. A snubber may be used at the hinge arms, the shoulder, and/or the door to control the rate of door movement.

The door assembly further includes a torque tube supported by door structure in a manner that permits rotation of the tube about its longitudinal axis. An interior handle is connected to the torque tube. The interior handle is preferably integrally formed with a vent door/outer handle. Rotation of the handle causes like rotation of the vent door. In the closed position, the vent door covers a pressure relief vent opening. During door opening, the vent door is shifted to allow equalization of pressures between the cabin and the ambient atmosphere.

The door assembly further includes a latching assembly, hinge guide assembly, and frame guide assembly that all cooperate to give the door the desired motion. In general, these assemblies each include various rollers that engage with tracks. In operation, the torque tube is rotated to cause the door to move from a closed position to an open position. In doing so, the shape and orientation of the latch assembly, the hinge guide assembly, and the frame guide assembly cause the upper door edge to initially move inward and downward relative to the body opening while the lower edge of the door to initially moves downward and outward relative to the body opening.

In accordance with other aspects of this invention, the latching assembly has at least one latch roller that is connected to the torque tube and engageable with a latch track located in body structure at the door opening. Preferably, there are two latch rollers and two latch tracks. The latch roller is offset radially from each end of the torque tube. The latch tracks include a passageway portion for biasing the latch rollers and the door in a closed position.

In accordance with further aspects of this invention, the hinge guide assembly includes at least one mounting panel roller that protrudes from the door upright mounting panel and engages a hinge guide track located on the hinge arm. The guide track includes a lateral passageway portion followed by an upright passageway portion to cause the door upper edge to first move inward and then downward. In embodiments having two upright mounting panels, two rollers are provided. Each roller extends toward its corresponding hinge arm where the rollers are engaged by guide tracks located on the arms.

In accordance with still other aspects of this invention, the frame guide assembly includes at least one guide roller extending longitudinally from the door frame upright sides. The guide roller engages a body track that is located in the body structure at the opening. Preferably, there are two frame guide rollers and corresponding body tracks, one pair being positioned at opposite side edges of the door/body structure. The body tracks preferably include an upright portion followed by a diagonal portion in order to cause the door lower edge to initially move downward and then down and outward. This present invention describes this roller as also functioning as a pressure stop, this dual function being preferred but not required for operation.

In accordance with still further aspects of this invention, the door assembly has a locking mechanism for steadying the door in its open position. The locking mechanism includes a lock-engaging surface connected to the distal end of a hinge arm and a lock pawl rotatably connected to the door near the locking surface. Rotation of the door to its open position causes the lock pawl to engage the lock surface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
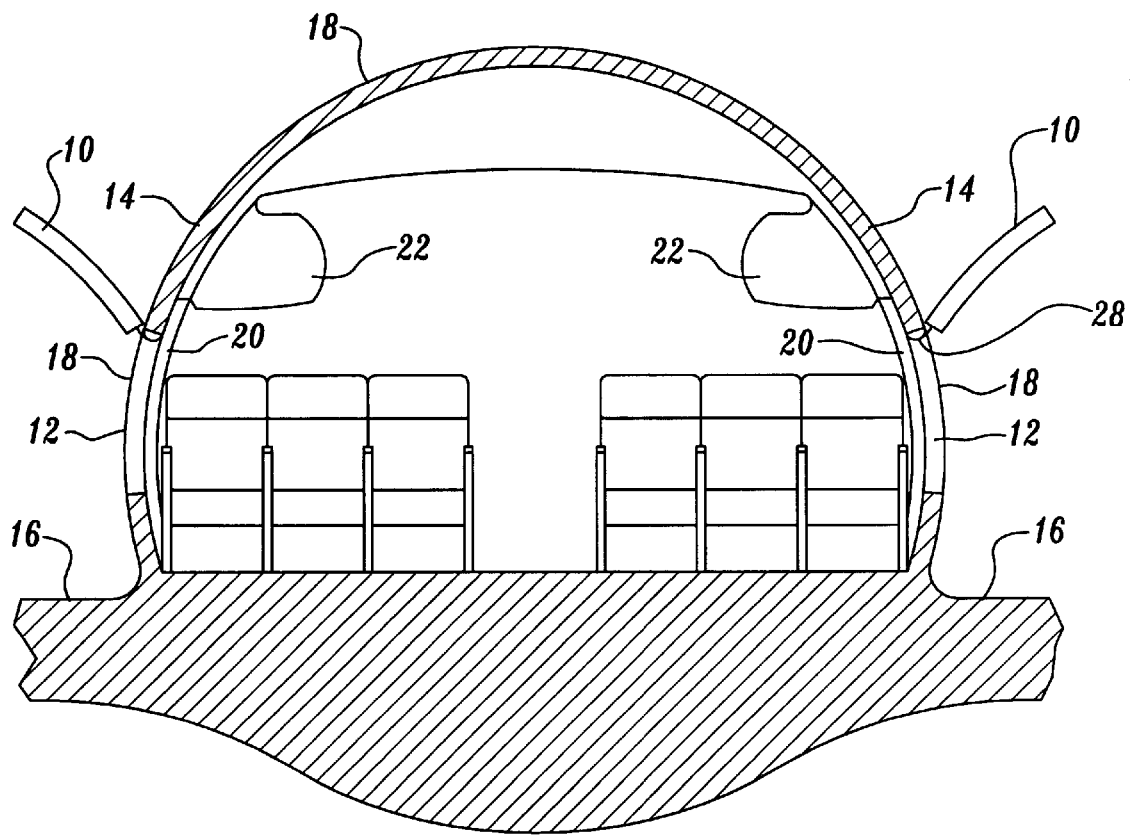
FIG. 1 is a cross-sectional schematic view of an aircraft fuselage overwing section utilizing a pair of door assemblies made in accordance with the principles of the present invention.

The overall orientation of a door assembly formed in accordance with the present invention is shown in FIG. 1. The assembly includes a door 10 adapted for use in an emergency exit opening 12 in the overwing section of an aircraft fuselage 14. The door 10 of FIG. 1 is shown in a fully open position. In the fully open position, the lower edge of the door 10 is located vertically above and laterally outboard of the opening 12. With the door 10 held in the illustrated canopy position, the passengers may most easily exit the aircraft fuselage 14 and progress onto the aircraft wings 16 and beyond. As described in detail below, both the door 10 and the mechanisms that provide the movement of the door 10 are located substantially within the space between an outer fuselage skin 18 and an interior cabin liner 20 when the door assembly is in its closed position. As a result, the mechanisms providing movement of the door 10 do not violate the passenger headroom area, the overhead storage bins 22, or any passenger service systems. This is a particularly desirable feature for most commercial aircraft customers.

Figure 2:
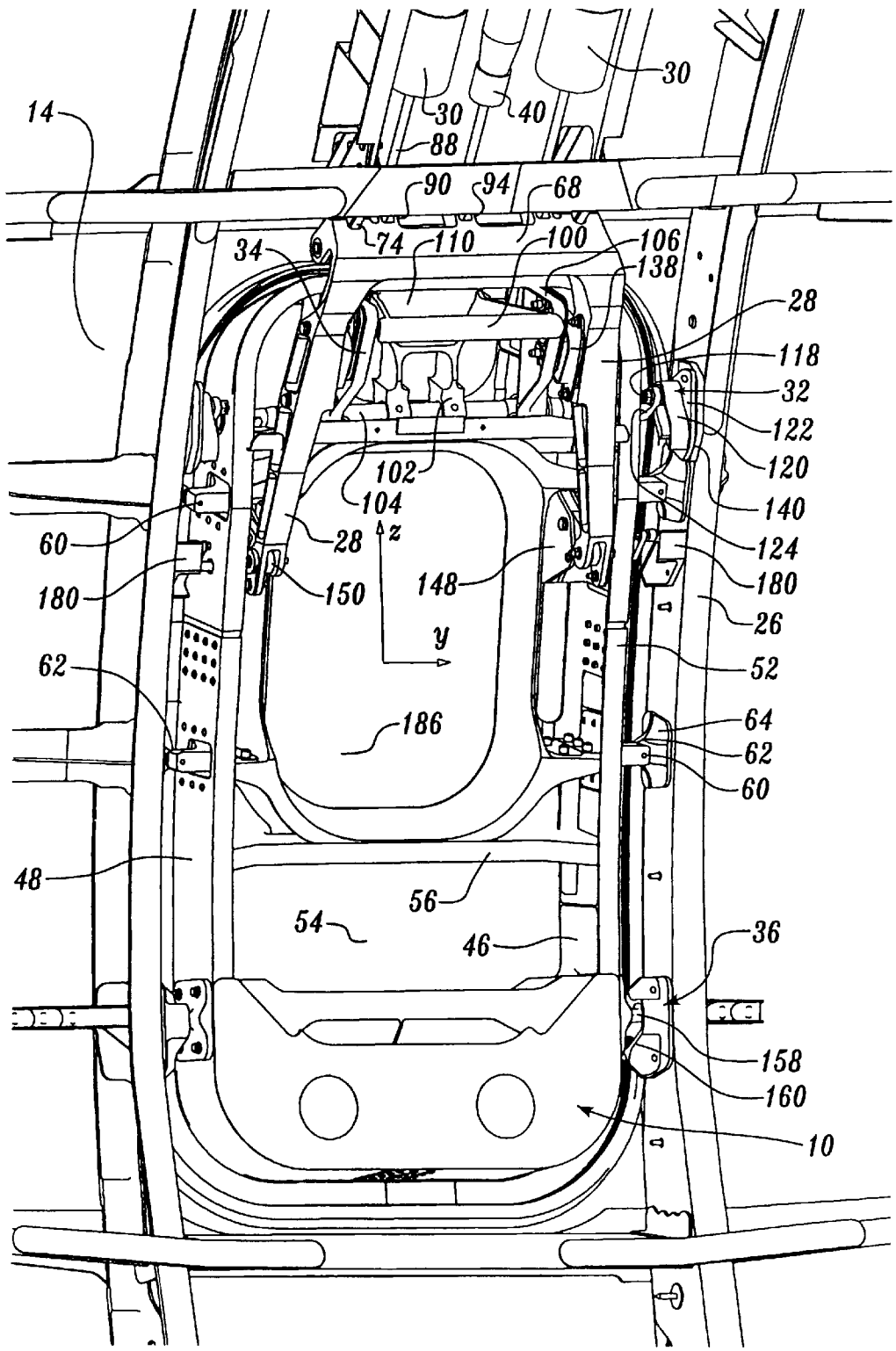
FIG. 2 is a perspective view of a preferred embodiment of a door assembly formed in accordance with the present invention, as viewed from a position inside the aircraft.

As shown best in FIG. 2, the door 10 is in rotatable communication with aircraft body structure 26 via one or more hinge arms 28 that are pivotably mounted to the structure and rotatably engaged with the door 10. One or more actuators 30 provide a force against the hinge arms 28, urging them continuously to move the door open. A latching assembly 32 is formed between the side surfaces of the door 10 and adjacent body structure 26 at the door opening 12. As its name implies, the latching assembly 32 provides the main mechanism by which the door 10 is latched and unlatched. In addition, a hinge guide assembly 34 and a frame guide assembly 36 are provided to guide the door 10 in moving between its open and closed positions. The hinge guide assembly 34 operates between door structure and the hinge arms 28. The frame guide assembly 36 operates between the lower door side surfaces and adjacent body structure 26 at the door opening 12. The door assembly optionally includes a locking mechanism 38 (FIG. 4) to maintain the door 10 in an open position and a snubber 40 to regulate door velocity.

Figure 5:
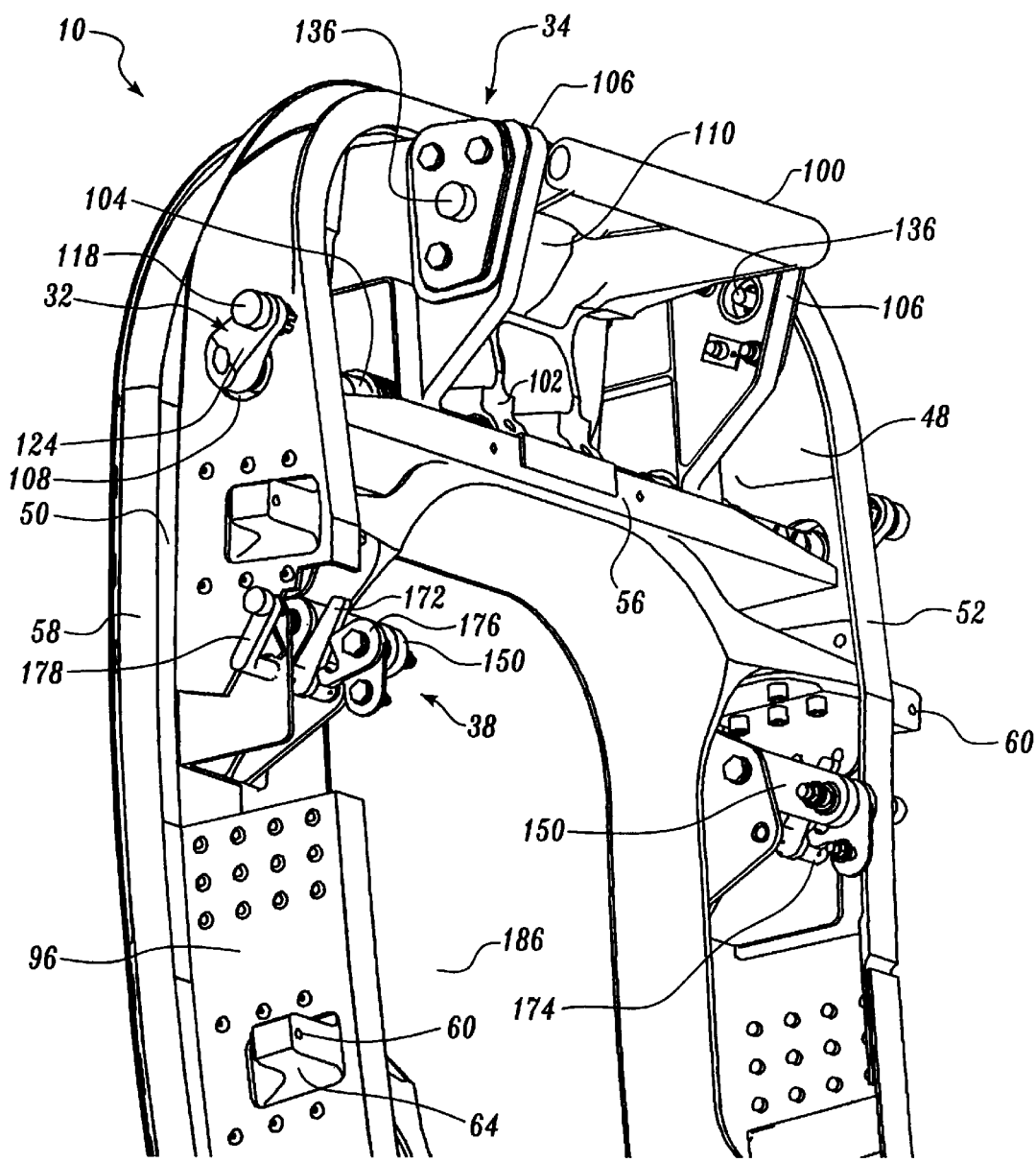
FIG. 5 is a perspective view of upper portions of the door of FIG. 2 without the hinge of FIG. 4 and with portions of the door being partially cut away to more clearly show details of lower hinge attachment components.
Figure 6:
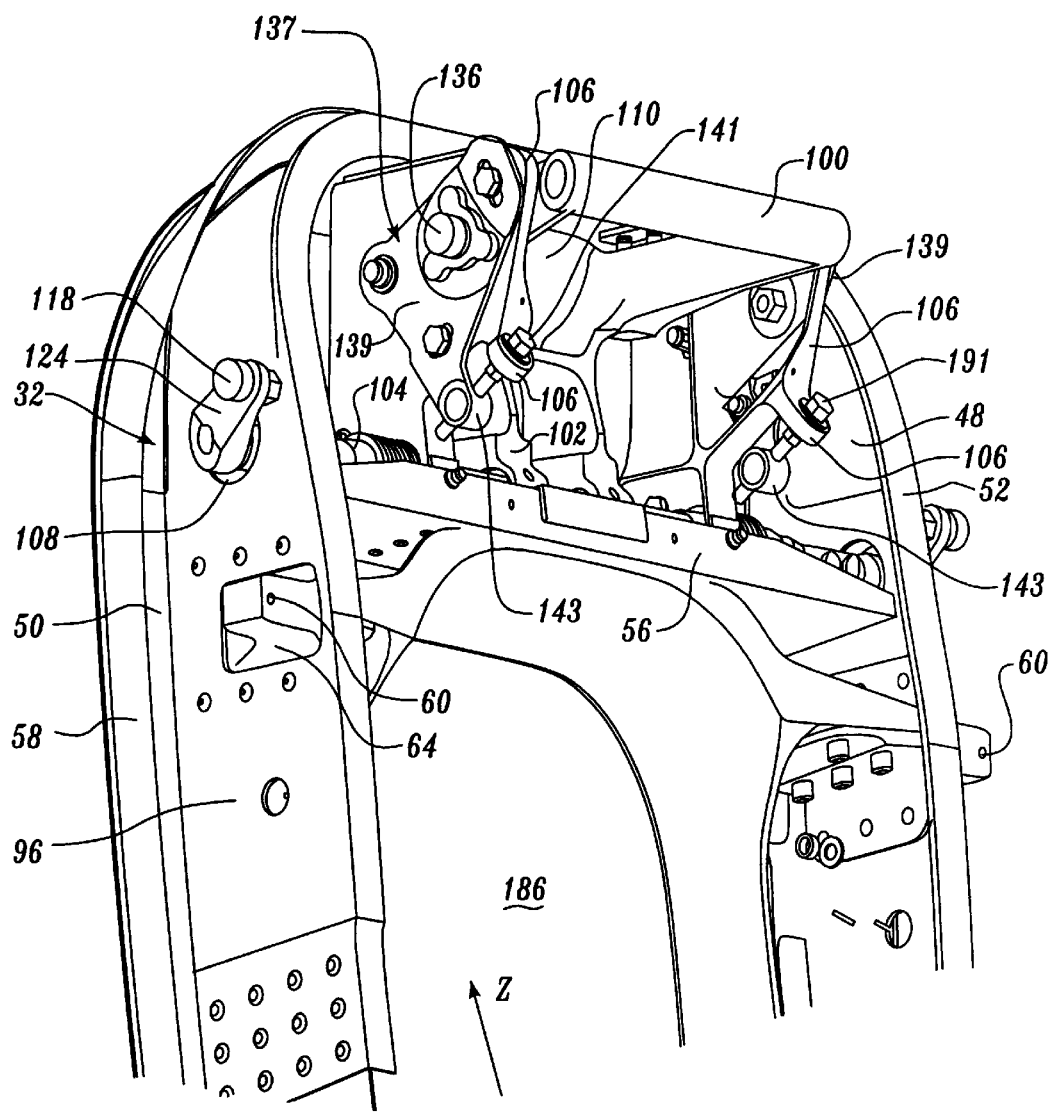
FIG. 6 is a perspective detail view of an alternative embodiment of an adjustment mechanism with portions of the door being removed to more clearly show details of the mechanism.

Referring to FIG. 2, the door 10 is of plug-type design, having a frame 46 configured to snugly fit within the aircraft opening 12. The frame 46 is formed from a number of interconnected structural members and has a depth approximately equal to the thickness of the aircraft fuselage walls. The depth is generally defined by a peripheral flange 48 that establishes the perimeter of the frame 46. Referring to FIG. 5, an outer lip 50 and an inner lip 52 of extend transverse from the outer and inner edges of the peripheral flange 48, respectively. The peripheral flange 48, the outer lip, and the inner lip have curvatures that allows the frame 46 to blend with the curvatures of the aircraft fuselage 14 so that their surfaces are flush with the outer skin 18 and the interior cabin liner 20. The frame 46 also includes a solid outboard wall 54 and a lattice structure 56 internal to the peripheral flange 48. The lattice structure 56 increases the structural integrity of the frame 46 and provides supports to which door components can be mounted. A conventional sealing member 58 is disposed about the periphery of the frame outer lip in order to maintain an airtight seal between the interior and the exterior of the aircraft.

The pressure on the inboard surface of the door 10 is normally greater than that on the outboard surface because of internal cabin pressurization employed during flight. As a result, conventional stop mechanisms are employed so that the plug-type door 10 is not expelled outwardly through the opening 12 of the aircraft. Referring to FIG. 2, a number of stop pins 60 are mounted to side surfaces of the door frame 46 at spaced locations along the peripheral flange 48. The pins themselves are oriented laterally outboard, though, their supporting structure extends from the flange 48 longitudinally. Mounted to the sides of the opening 12 and directly adjacent the stop pins, are a corresponding number of stop pads 62. The stop pins are designed to cooperatively rest against or insert into the stop pads 62 to prevent direct outward movement of the door 10. Both stop pins 60 and stop pads 62 typically have baseplates 64 to assist in their mounting to the frame 46 and fuselage 14, respectively.

Figure 3:
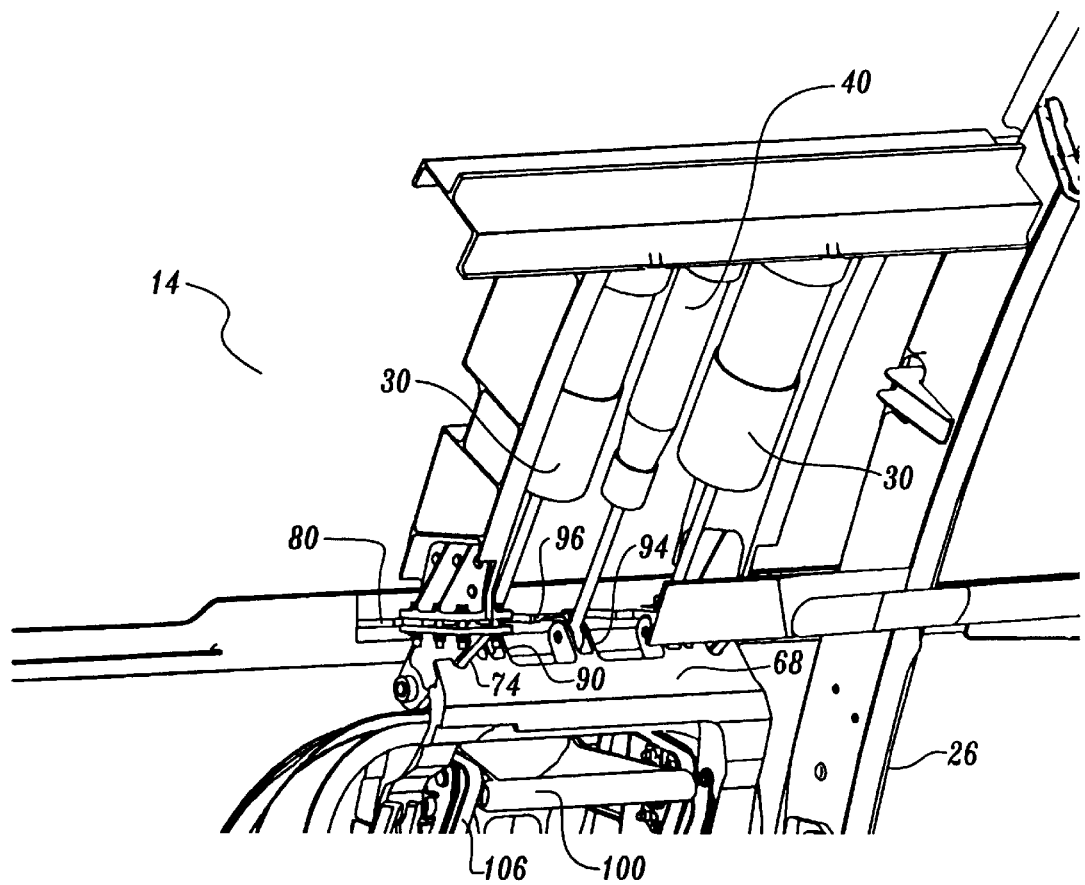
FIG. 3 is a detail perspective view of an arrangement of actuators for use in the door assembly of FIG. 2, the view of FIG. 3 being partially cut away to more clearly show details of the installation.
Figure 4:
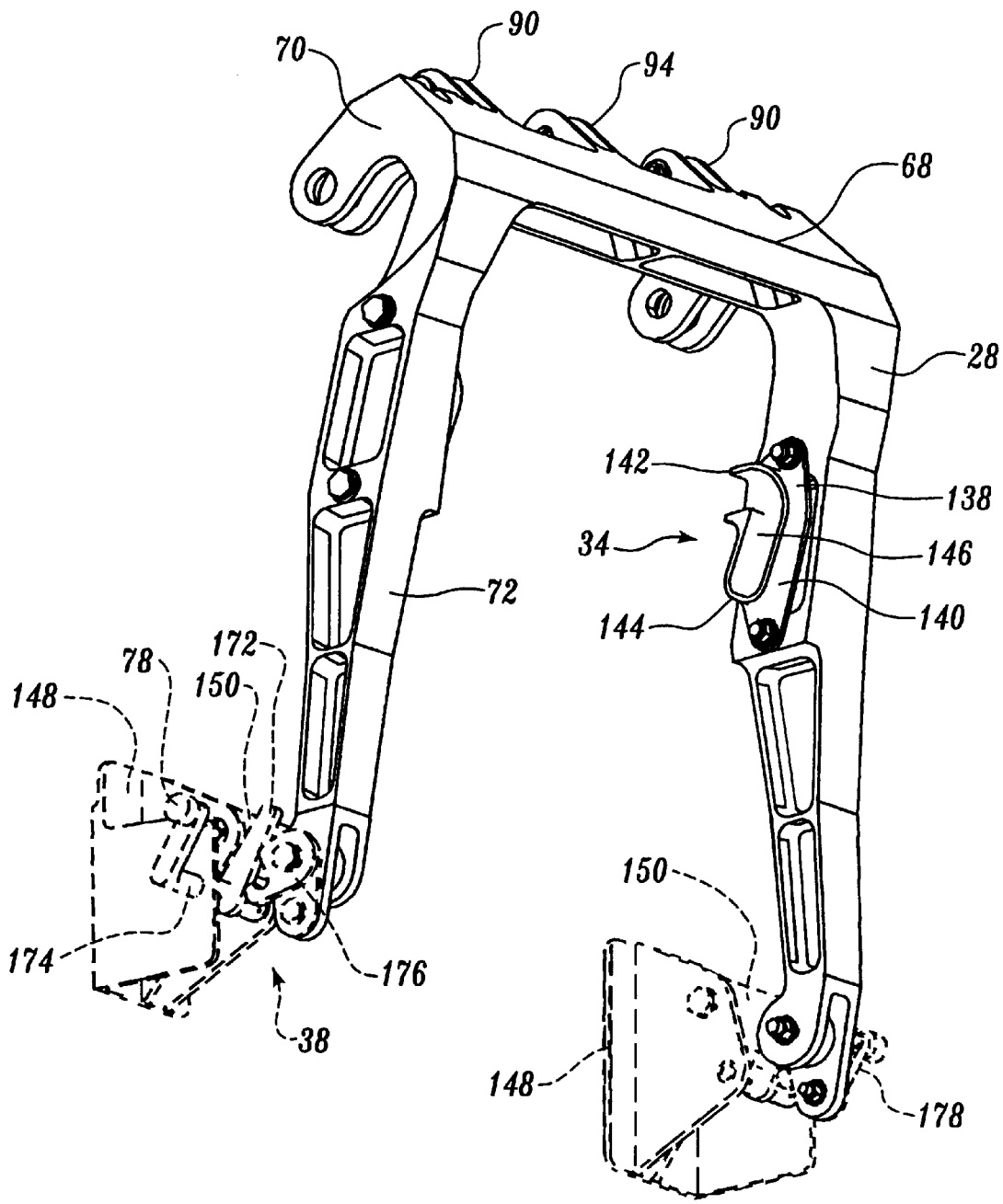
FIG. 4 is a perspective view of a pair of gooseneck hinge arms formed in accordance with the present invention for use in the door assembly of FIG. 2 with preferred lower hinge attachment components and locking mechanisms being shown in phantom.

Referring to FIGS. 2–4, downward and outward swinging movement of the door 10 is provided by at least one hinge arm 28. Preferably, there are a pair of gooseneck hinge arms. The gooseneck hinge arms are rotatably connected at their proximate ends to the aircraft body above the door opening and are rotatably and translationally connected at their distal ends to the door. Each gooseneck hinge arm includes an arcuate portion 70 located near the hinge arm proximate end and a substantially linear portion 72 located near the hinge arm distal end. The arcuate portions are interconnected by an upper shoulder 68. The combination of the arms, their arcuate and linear portions 70, 72, and the shoulder 68 is preferably formed as a single integral structure. The hinge arm proximate ends are pivotally mounted to the aircraft body 14 at a fuselage mounting bracket 74 using rotatable connection means. The connection of the hinge arm distal ends with the door 10 is described in detail below with regard to the hinge guide assembly 34.

Referring particularly to FIGS. 3 and 9, the driving force for movement of the hinge arms 28, and hence the door 10, is provided by a pair of actuators 30. Compression spring actuators are shown in the drawings, however, any one of a number of available actuators may be used, e.g., hydraulic, electrical, etc. As shown in FIG. 3, the actuators 30 are disposed above an upper sill 80 located near the fuselage opening 12. As shown best in FIG. 9F, a protective actuator housing 82 has an upwardly oriented end extension 84 that is pivotally mounted to any suitable structural member of the aircraft fuselage 14 via an actuator mounting bracket 86.

Referring to both FIGS. 3 and 9, each actuator 30 includes a rod 88 that is pivotally mounted at its distal end to a protuberance 90 located along the arcuate portion 70 of the hinge arms 28. Each actuator 30 is configured to continuously push its rod 88 outward, away from the housing 82. In doing so, the rod 88 exerts a downward force on the hinge arms 28. The protuberance and/or the rod 88 extend through an opening 92 in the upper sill 80. The opening 92 is such that the protuberance and rod 88 are provided with adequate clearance when the hinge arm 28 is pivoted during door opening 12 and closing.

Referring to FIG. 3, the snubber 40 is located between the actuators 30 and is oriented similarly. Snubbers are generally known to those skilled in the art and therefore are not described herein. The snubber 40 is in communication with a third protuberance 94 that extends upward from a mid-location along the shoulder 68. An additional upper sill opening 96 is similarly provided to accommodate the snubber 40 and/or third protuberance 94 during door movement.

Referring to FIG. 2, movement of the door 10 is initiated by pulling an internal handle 100. The internal handle is fixedly mounted to a torque tube 104 at positions near the tube's longitudinal midsection. Rotation of the internal handle 100 causes the torque tube to rotate about its longitudinal axis which is generally parallel to the aircraft centerline. In the embodiment of FIGS. 2–9, two upright mounting panels 106 extend inwardly from the outboard wall 54 at locations between the hinge arms 28. The internal handle 100 is located between the upright mounting panels 106 with the torque tube passing transversely through holes in panels. The ends of the torque tube 104 extend beyond the mounting panels and through openings 108 in the peripheral flange 48. A number of bearings (not shown) are used at the flange holes to support the torque tube. Movement of the torque tube 104 is thus constrained to rotation about its longitudinal axis only. The torque tube ends each include components that form a portion of the latching assembly 32 described below.

The internal handle 100 is also connected to a pressure relief vent door 110, which covers a vent opening 112 formed in the outboard wall 54. In the embodiment of FIGS. 2–9, the internal handle 100 and vent door 110 are integrally formed. Actuation of internal handle 100 rotates the pressure relief vent door 110 inboard and away from the vent opening 112. This provides a passageway for equalizing the pressure between the cabin interior air and the ambient exterior air. The vent door 110 has a seal member 114 about its perimeter. The seal member is formed of a resilient yet elastomeric material such that both extended use and an efficient seal are provided. For redundancy, handle biasing components (not shown) may be added. They are not provided in the embodiment of FIGS. 2–9 since the function of maintaining the handle 100 and vent door 110 in a closed position is already provided by the torque tube 104 and the latching assembly 32 as described below.

There are generally three mechanisms used in the present invention to control the motion of the door 10 in going between open and closed positions. The mechanisms are the latch assembly, the hinge guide assembly 34, and the frame guide assembly 36. These three mechanisms cause at least two distinct motions of the door 10. The first motion is that the door itself moves relative to the hinge arms 28. The second motion is that the door 10 and hinge arms 28 move relative to the fuselage 14. In the first motion, the upper regions of the door rotate slightly inward and then the entire door 10 translates slightly downward relative to the hinge arms 28. The combination of these motions results in the lower edge of the door 10 moving outward and downward while the upper edge moves inward and downward. In the second motion, the door 10 is free of the fuselage 14 and is extended away from the hinge arms 28, hence the continuous force of the actuator 30 causes both the door 10 and hinge arms 28 pivot outward from the fuselage 14 about the hinge arm arcuate portion rotatable connections to the fuselage 14.

Figure 7:
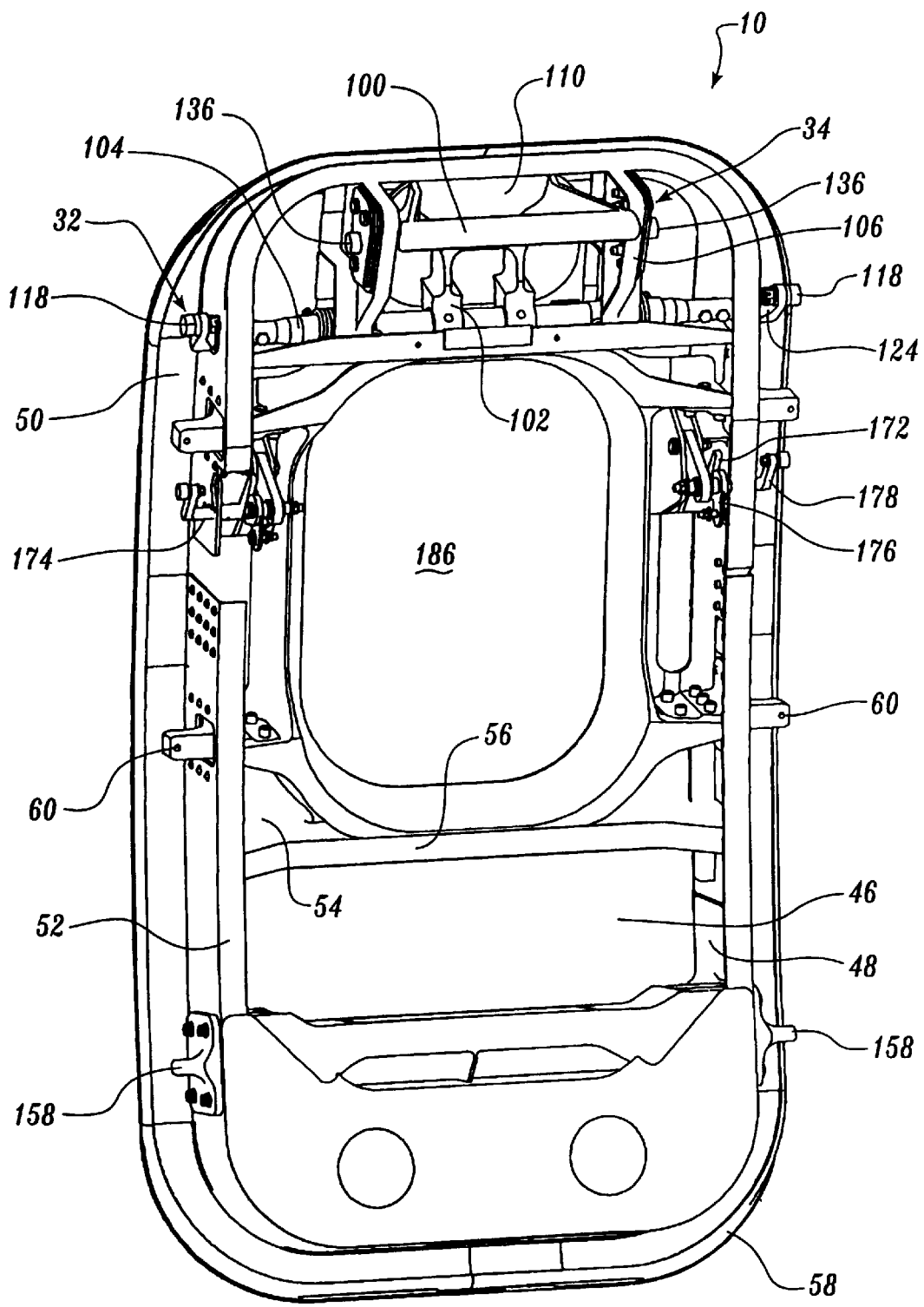
FIG. 7 is a perspective view of the door of FIG. 2 without the hinge of FIG. 4 and with portions of the door being partially cut away to more clearly show details of the lower hinge attachment components.

Referring to FIGS. 2, 5, and 7, the latching assembly 32 includes a pair of latch rollers 118 engageable in corresponding latch tracks 120. The latch tracks 120 are attached to, or integral with, a baseplate 122 that is mounted to the upright side surfaces of the opening 12. Each latch roller is rotatably mounted to a crank arm 124 that extends radially outward from one end of the torque tube 104. Each crank arm 124 and roller 118 is thereby located in a track that is positioned between body side structure at the opening 12 and the peripheral flange 48. The connections of the crank arms to the torque tube 104 are fixed so that rotation of the torque tube 104 will cause similar rotation of the crank arms 124 and latch rollers 118 relative to the torque tube 104.

Each track has a closed upper end 126, an open lower end 128, and an intermediate passageway 130 therebetween designed to cooperatively engage its respective roller. A portion of the passageway near the closed upper end 126 is shaped and positioned generally transverse to the pressure forces acting on the door 10. This arrangement requires the operator to positively redirect the latch rollers 118 in order to open the door. Beneath the transverse passageway portion is a final portion that directs the rollers both downward and inward which in turn causes the upper regions of the door to also move inward. Once the rollers have passed the track open end, the rollers disengage entirely from the latch tracks 120.

Referring to FIGS. 2, 4, and 5, the hinge guide assembly 34 includes mounting panel guide rollers 136 extending from the outboard side surfaces of the upright mounting panels 106. Since the mounting panels 106 are both located between the hinge arms 28, the guide rollers 136 extend from their respective mounting panels 106 in a direction toward the nearest hinge arm. Each guide roller is engageable with a hinge guide track 138 located in the side surface of its corresponding hinge arm as shown in FIG. 2.

It is generally desirable to include a mechanism by which the mounting panel rollers may be adjusted in position in order to properly align the door relative to the opening. Known aligning devices may be used, such as opposed serated plates. An alternative embodiment of an adjustment mechanism 137 is provide with reference to FIG. 6. The mechanism 137 includes a plate 139 adjustably attached to each mounting panel 106. The orientation of the plate is modified by turning a screw 141 threaded through a hole in the mounting panel and an aligned barrel nut 143 extending from the plate 139. This compactness of this embodiment makes it advantageous in applications for which space is limited.

As viewed best in FIG. 4, the hinge guide tracks 138 are attached to, or integral with, baseplates 140 that are mounted to the upright inner side surfaces of the hinge arms 28. Each hinge guide track 138 has an open upper end 142, a closed lower end 144, and an intermediate passageway 146 therebetween designed to cooperatively engage its respective mounting panel guide roller 136. The open upper end is provided for ease of installation and maintenance, but otherwise is irrelevant to the movement of the door 10. The passageway 146 is shaped similar to an inverted and reversed "L" such that the passageway 146 at the open upper end extends inboard a short distance and then bends downward to reach the closed lower end.

Still referring to FIG. 4, the distal end of each hinge arm 28 is rotatably connected to the door 10 at a lower mounting bracket 148 via a connecting link arm 150. The lower mounting brackets 148 are secured to the frame 46. Each connecting link arm 150 rotatably engages at one end its respective lower mounting bracket 148 and at the other end its respective hinge arm 28.

In moving from a closed to open position, the hinge guide track 138 first directs the mounting panel 106 and hence the upper portions of the door inboard and then downward relative to the hinge arms 28. This movement is accommodated by the distal hinge arm rotatable connections to the lower mounting brackets 148. Once the mounting panel guide rollers 136 have reached the closed end, the combination of the door 10 and hinge arm 28 then continue to move as one, relative to the fuselage 14.

Figure 8:
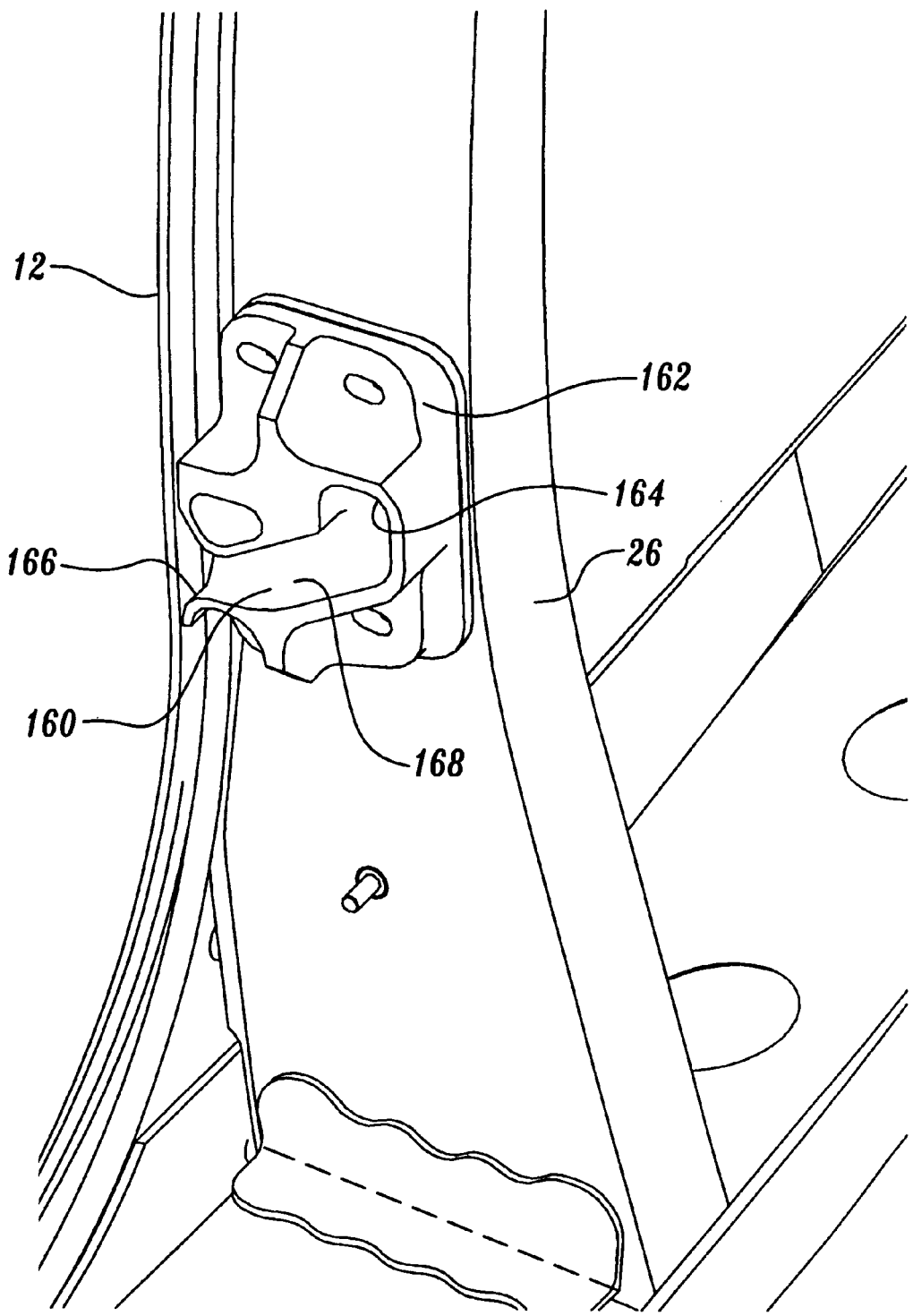
FIG. 8 is a perspective detail view of a frame guide assembly body track formed in accordance with the present invention for use in the door assembly of FIG. 2.

Referring to FIGS. 2, 7, and 8, the frame guide assembly 36 includes a pair of lower frame guide rollers 158 engageable with corresponding body tracks 160. The body tracks 160 are attached to, or integral with, baseplates 162 that are mounted to the lower upright side surfaces of the opening 12. Each guide extends outward from the peripheral flange 48 at locations adjacent their corresponding body tracks 160. Movement of the frame guide rollers 158 in the tracks causes similar movement of the door 10 relative to the body.

Each track has a closed upper end 164, an open lower end 166, and an intermediate passageway 168 therebetween designed to cooperatively engage its respective roller. The roller may optionally function as a pressure stop. In going from a closed to open position, the shape of the tracks forces the frame guide rollers 158 to first move downward and then move both downward and outward. The frame guide track shape works with the shapes of the latching assembly 32 and hinge guide assembly 34 so that the door 10 follows an overall desired path. When the frame guide rollers 158 have passed the track open end, the mounting panel rollers 136 and the latching rollers have also reached the ends of their travel and the door 10 and hinge may be rotated fully outward.

To steady the door 10 in its open position, it is preferred to include an optional locking mechanism 38, one embodiment of which is shown in FIG. 4. A lock pawl 172 is rotatably connected to one or both of the lower mounting brackets 148 via a rotatable through-shaft 174. A lock surface 176 extends from the lower edge of the corresponding hinge arm. The lock surface 176 is capable of engaging the lock pawl 172 once the door 10 has completed its motion relative to the hinge arms. As shown in FIGS. 9A–9F, in traveling from a closed to open position, the door 10 moves downward relative to the hinge arms 28. The lock pawl 172 falls into the lock surface 176 as the door is moved outward. Once fully open, the lock pawl 172 is butted against the lock surface 176 and held there by the weight of the door 10 pressing the pawl 172 into the lock surface 176.

In traveling from an open to closed position, the lock pawl 172 remains engaged with the lock surface 176 until the door 10 is starting to enter the fuselage opening structure. The through-shaft 174 extends through openings in the lower mounting bracket 148 and the peripheral flange 48. A tripping arm 178 is provided at the through-shaft ends to engage a release track 180 attached to the body structure 26 opening side surfaces. The shape of the release track 180 causes the tripping arm 178 to rotate the through-shaft 174 and lock pawl 172 away from the lock surface 176, thus allowing the door 10 to move relative to the hinge arms 28 and into a fully closed position.

A transparent window 186 is mounted in the central region of the door 10 to provide an unobstructed view between the interior and the exterior of the aircraft. Preferably, the vertical and horizontal cross members of the frame lattice structure 56 form the window frame required to keep the transparent window 186 in its mounted position. However, any conventional window mounting may be employed. Additionally, conventional sealing techniques may be used to provide a secure seal around the transparent window 186. Because of the configuration of the components of the door 10, the transparent window 186 may be of standard airplane window dimensions. This standardization of window size is of significant aesthetic consequence to airplane designers, customers, and consumers.

Referring to FIGS. 9A–9F, various panels may be used to hide the door assembly components, e.g., an interior door liner 188, a vent door panel 190, a handle cover 192, and a lower foot panel 194. While not explicitly shown, it should be understood that the interior door liner must contain an opening placed and configured to substantially meet the dimensions of the transparent window 186. Likewise, various seals may be employed as required.

Figure 9A:
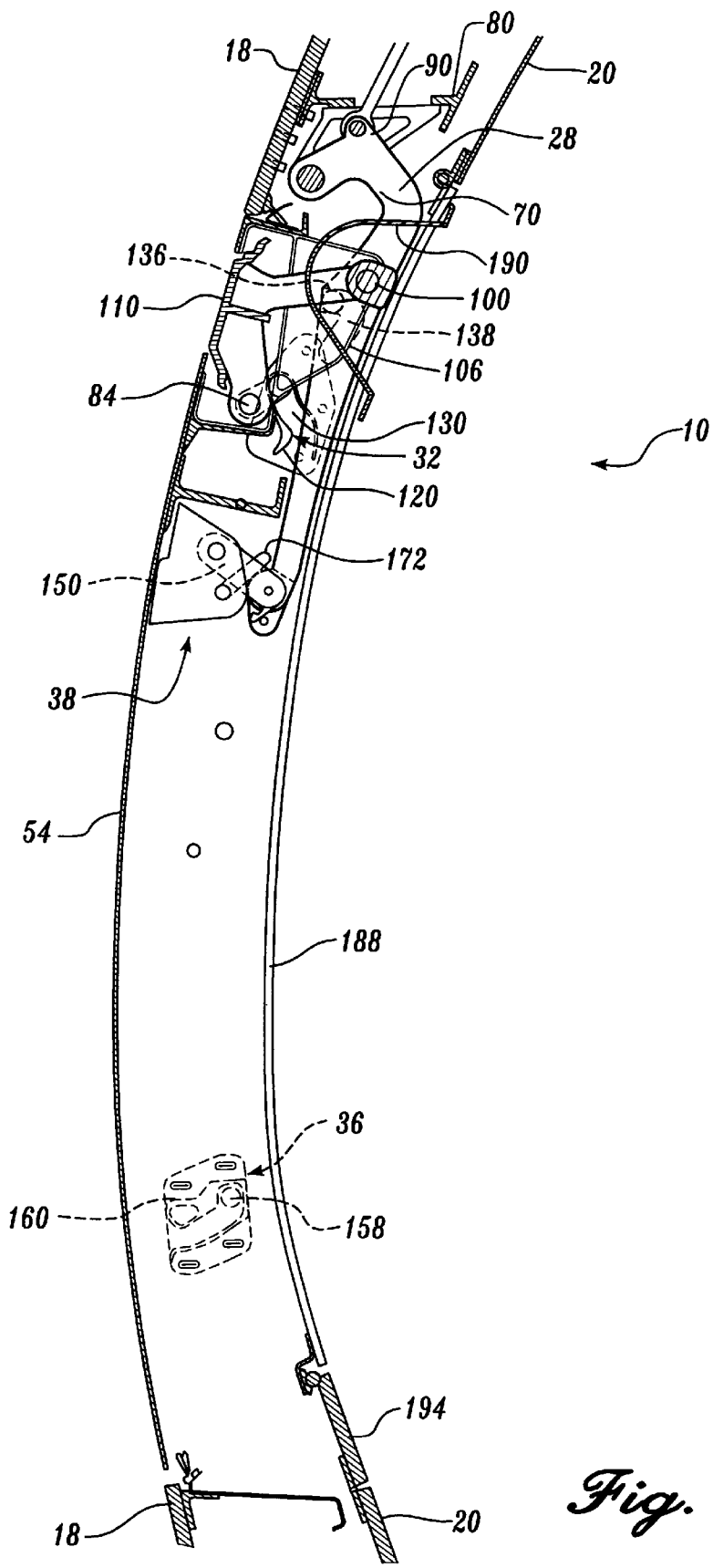
FIG. 9A–9F are side views of the door of FIG. 2 in a closed position, a vented position, a partially rotated handle position, a fully rotated handle position, a cocked position, and an open position, respectively, the views showing various components that are located in different planes.
Figure 9B:
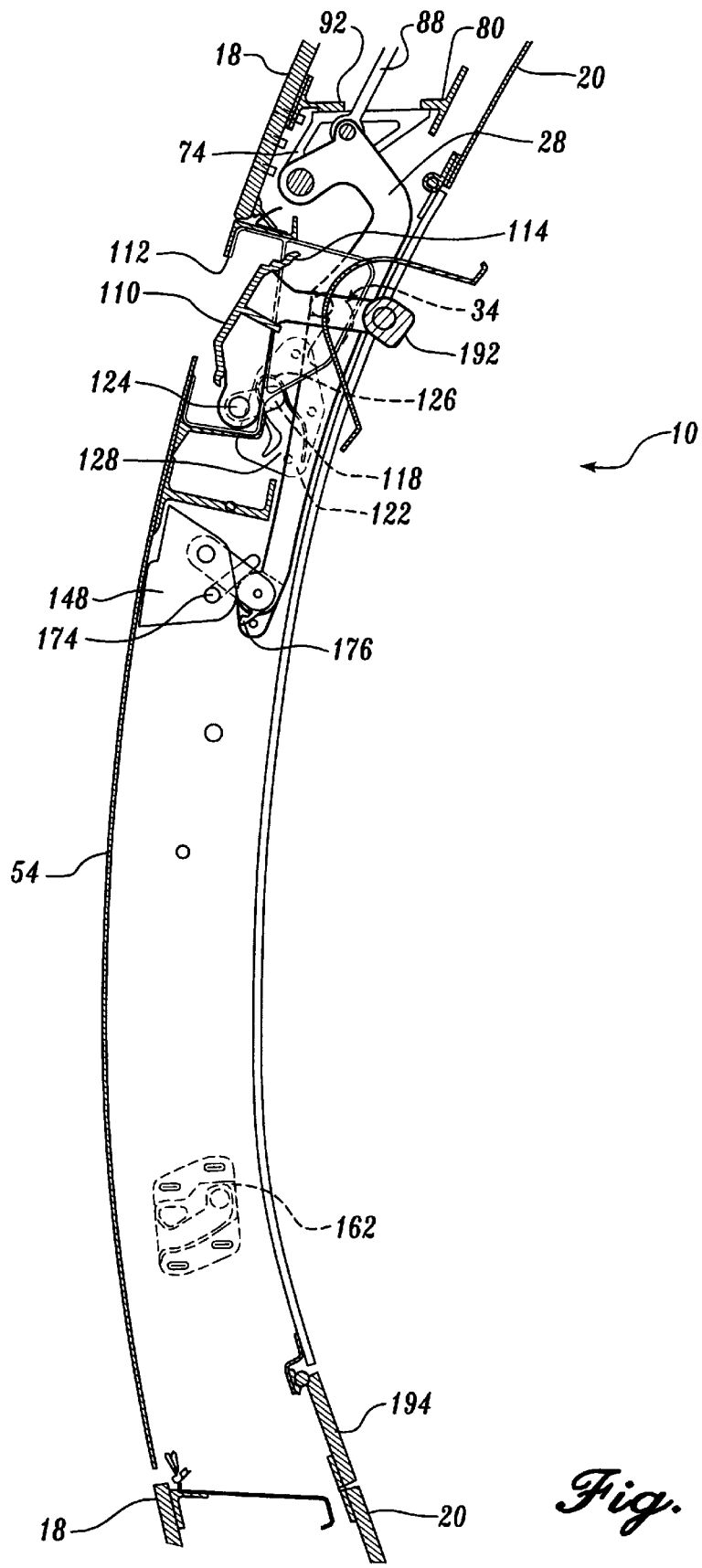

Referring to FIG. 9A, it will be appreciated that the components of the door 10 are substantially disposed within the space defined by the outer skin 18 of the aircraft and the interior cabin liner 20. Because the components fit within this relatively narrow space, passenger headroom over the outboard seats of the aircraft is not violated. Additionally, the hinge arms 28, the rods, and the actuators 30 also lie within the space defined by outer skin 18 and the interior cabin liner 20. Because this is true, the spaces provided for overhead storage bins 22 and the passenger service systems are not violated. As shown in FIG. 9B, only the internal handle 100 extends inboard beyond the interior cabin liner 20 and then only during door opening.

FIGS. 9A–9F are side views of the door assembly of FIG. 2 in a closed position, a vented position, a partially rotated handle position, a fully rotated handle position, a cocked position, and an open position, respectively. Referring to FIG. 9A, the door 10 is fully closed and latched. The door 10 is fitted into the fuselage opening 12 with the door outboard wall 54 flush with the fuselage 14 exterior. The door interior lining is flush with adjacent cabin lining. The latch rollers 118 are located at the closed ends of their respective latch tracks 120, and the mounting bracket rollers are at the open ends of their respective hinge guide tracks 138. The lower frame guide rollers 158 are at the upper closed ends of their corresponding body tracks 160, and the lock pawl 172 is rotated away from its adjoining lock surface 176.

To initiate door opening, either the internal handle 100 is pulled inward or the vent door 110 is pushed inward. Either action causes rotation of the torque tube 104 and movement of the latch rollers 118 in their corresponding latch tracks 120. Door opening may alternatively be accomplished by action of an automatic door opening system (not shown) arranged to mechanically, hydraulically, or electronically rotate the torque tube 104. Once the torque tube 104 has been partially rotated, the door assembly is said to be in a vented position as illustrated in FIG. 9B. In the vented position, the vent door 110 is moved away from the vent opening 112 to allow interior cabin pressure to adjust to the exterior pressure level. In addition, the latch roller has moved out of the upper portion of the passageway 130, thereby unlatching the door 10.

Figure 9C:
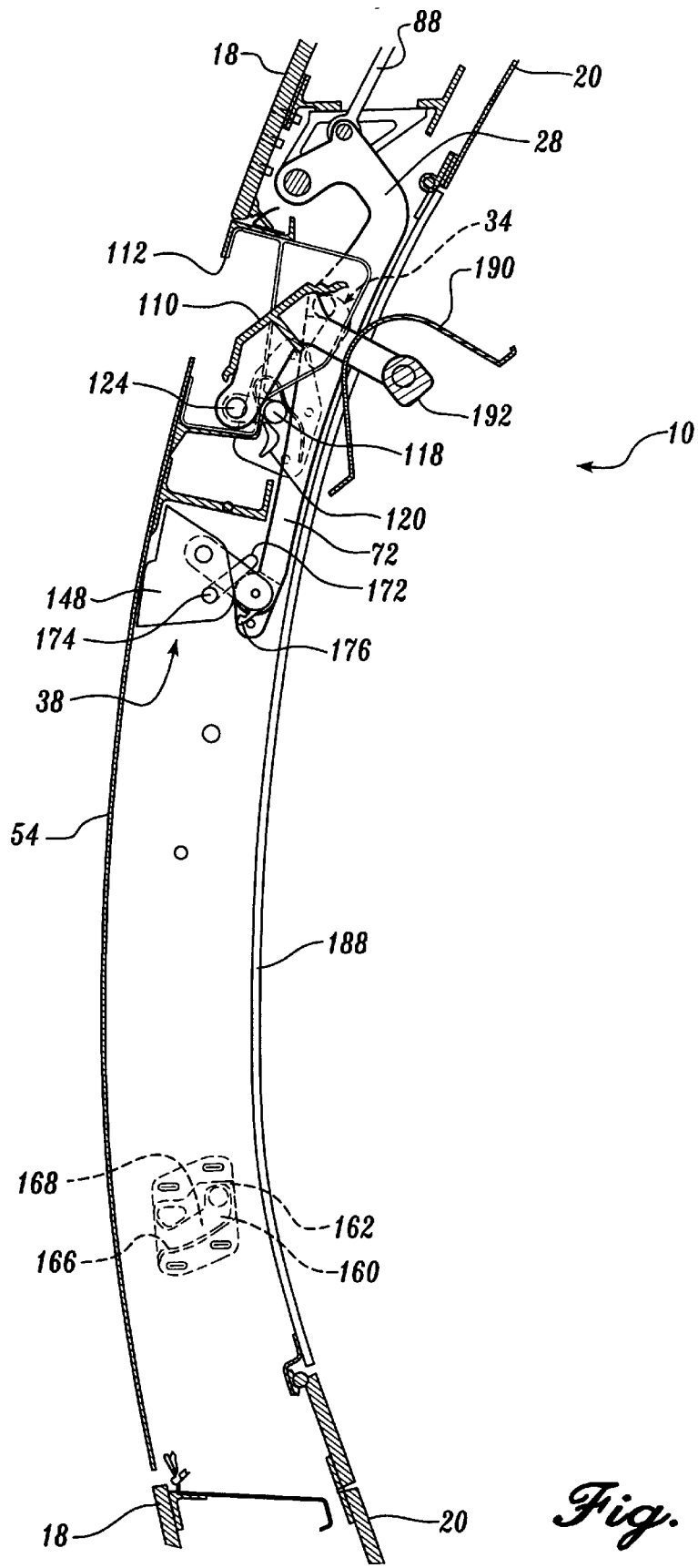

Referring to FIG. 9C, continued inward rotation of the handle 100 and vent door 110 causes continued rotation of the torque tube 104. Due to the shape of the latch track passageway final portion, the upper regions of the door move slightly inward. This further causes the mounting panel rollers 136 to translate inward along the initial portions of their corresponding hinge guide tracks 138. The lower regions of the door rotate slightly about the guide rollers. The position of FIG. 9C is referred to as a partially rotated position. Another name for this position is "ice breaking", since the door outboard wall 54 is no longer flush with the fuselage exterior and the door seals have started to release. Any exterior ice built up between the door 10 and the fuselage 12 would be starting to break at this position.

Figure 9D:
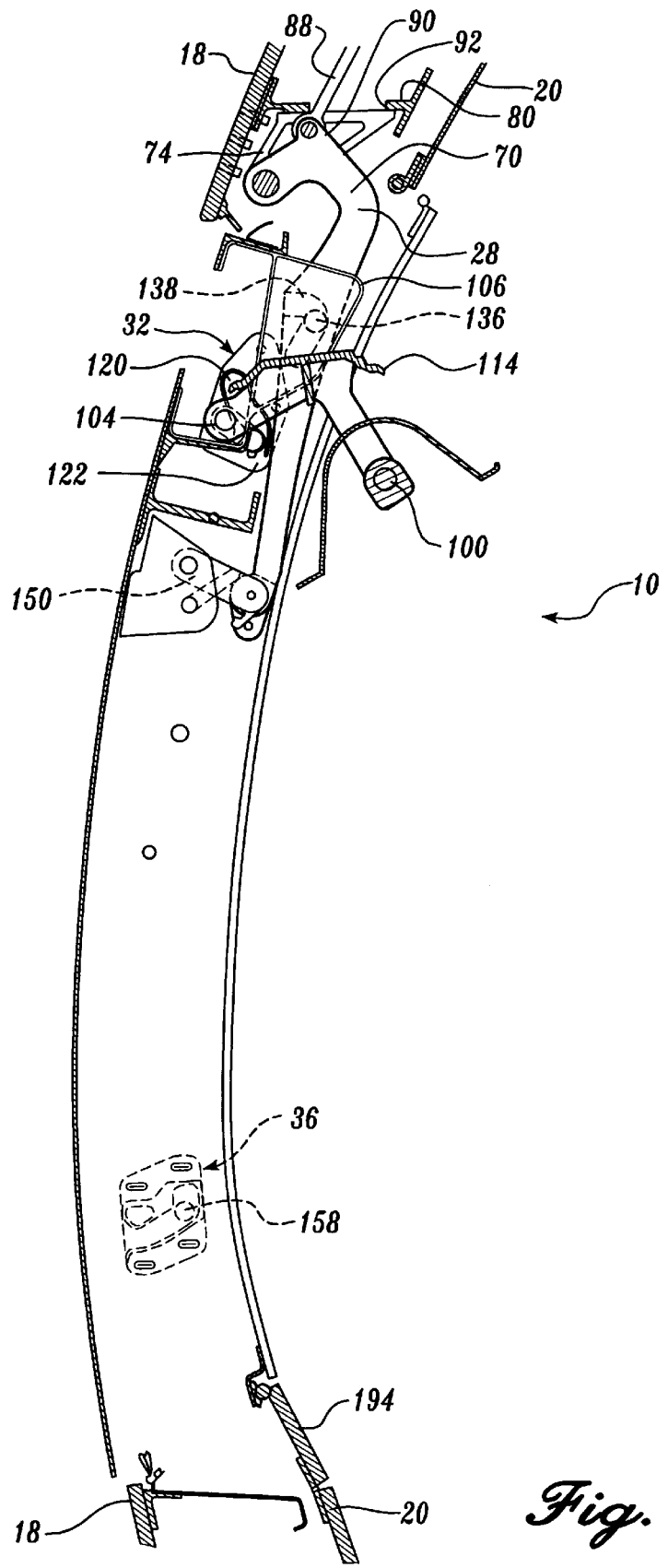

Referring to FIG. 9D, continued inward rotation of the handle 100 and vent door 110 eventually positions the torque tube 104 in a fully rotated state. The latch rollers 118 have reached the open end of their respective latch tracks 120, the mounting panel rollers 136 have rounded the bend in the hinge guide tracks 138, and the lower frame guide rollers 158 have reached the diagonal portion of the body tracks 160.

Figure 9E:
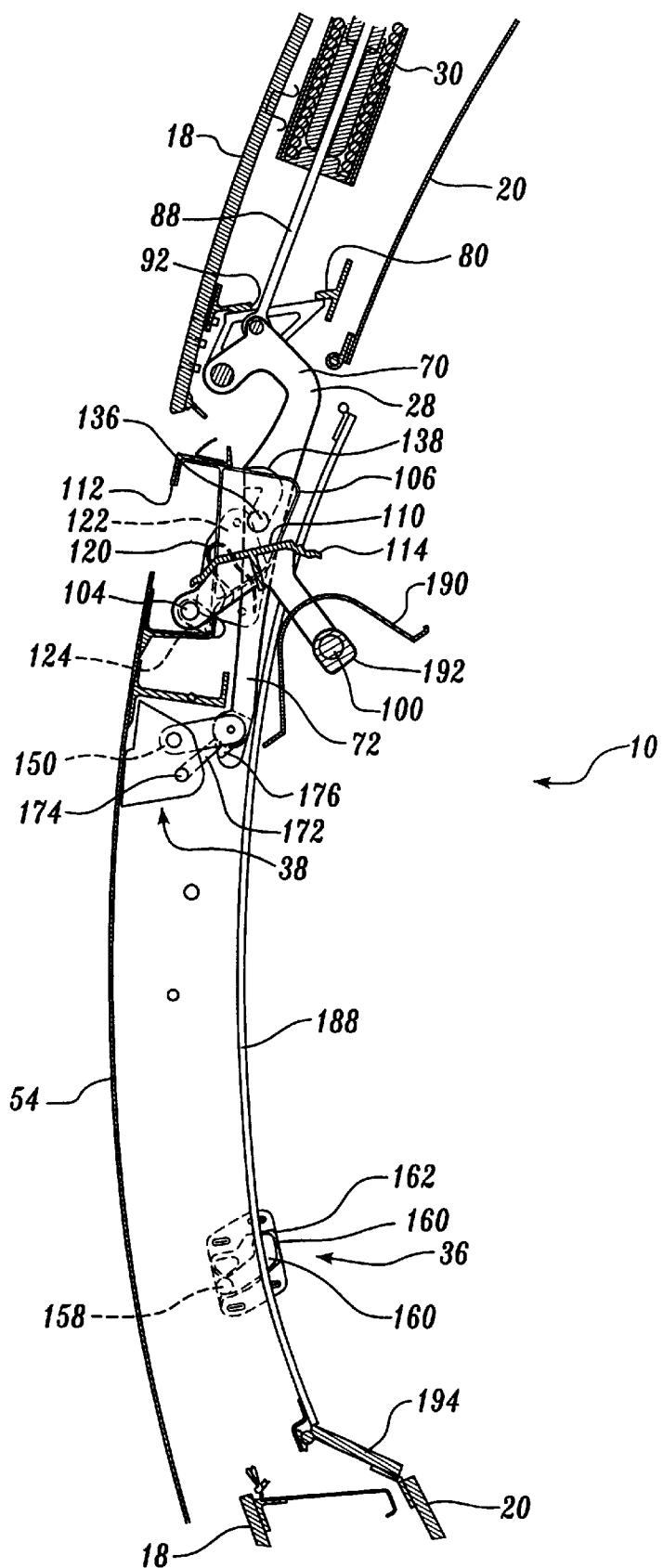

Since the latch rollers 118 are now free from their tracks, the weight of the door 10 causes the entire door 10 to move downward relative to the hinge arms 28 and the door opening 12 as shown in FIG. 9E. The mounting panel rollers 136 are at the closed ends of the hinge guide tracks 138, the distal hinge arm ends are position slightly above the lower bracket via rotation of the connecting link arm 150, and the lock pawl 172 has fallen into the lock surface 176. The position of FIG. 9E is referred to as a cocked position because the frame guide rollers 158 are at the ends of the body tracks 160 and the door 10 is free to open fully.

Figure 9F:
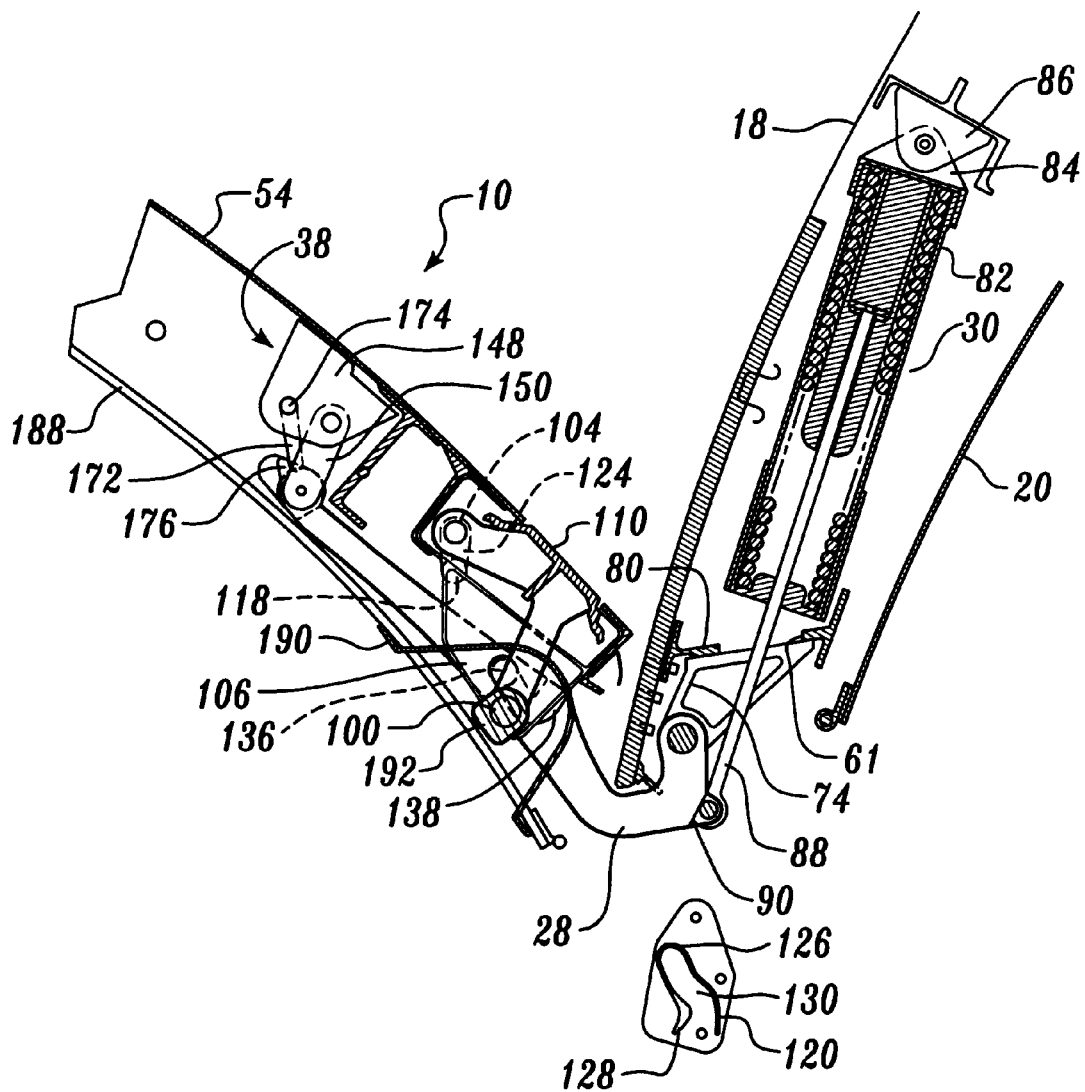

Referring to FIG. 9F, the continuous force of the actuators 30 rotates the hinge arms 28 about their rotatable connection to the fuselage 14 structure and thus opens the door 10. As will be appreciated by viewing FIG. 9F, the distance between the hinge arm connections to the fuselage 14 and the actuator connections to the hinge arms 28 acts as a moment arm to rotate the door fully outward.

Reverse operation of the door assembly is accomplished in a reverse manner. The lower end of the door is moved toward the opening 12. When the stop pin 60 reaches the body track openings, the tripping arm 178 engages the release track 180. By following the release track 180 a short distance, the tripping arm 178 causes the lock pawl 172 to rotate away from the lock surface 176. At the position of release, the latch rollers 118 are entering their respective latch guide tracks. The operator must now manually lift the door 10 upward until the mounting panel rollers 136 have reached the bend in their hinge guide tracks 138 and the frame guide rollers 158 have traveled the diagonal portions of their body tracks 160. Once there, the handle 100 may be rotated fully back to move the latch rollers 118 to the closed ends of the latch tracks 120, the mounting rollers to the open ends of the hinge guide tracks 138, the frame guide rollers 158 to the closed end of the body tracks 160, and the vent door 110 over the vent opening 112. The door assembly is thereby closed.

It should be understood that there are state-of-the-art mechanisms commonly employed in existing doors and hatches that have not been illustrated for the sake of simplicity and clarity. However, such mechanisms could be easily added to a door assembly formed in accordance with the present invention. Examples of such mechanisms include a flight lock mechanism (as required by some regulatory authorities) that serves as a secondary backup to prevent the door from inadvertently being opened during unpressurized flight.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A door assembly for covering an opening formed in a body of an aircraft, the door assembly comprising:
  (a) a door formed of a number of interconnected structural members including a mounting panel; at least one hinge arm rotatably connected at a proximate end to the aircraft body above the door opening and movably connected at a distal end to the door; an actuator interconnected between the aircraft body and the at least one hinge arm, the actuator to pivot the at least one hinge arm about its rotatable connection to the aircraft body; and a torque tube supported by the door and rotatable via an interior door handle;
  (b) a latching assembly including a latch roller connected to the torque tube and engageable with a latch track located in the aircraft body at the opening;
  (c) a hinge guide assembly including a mounting roller connected to the mounting panel and engageable with a hinge guide track located on a side surface of the at least one hinge arm at a location between its proximate and distal ends;
  (d) a frame guide assembly including a frame guide roller connected to the door frame and engageable with a body track located in the aircraft body at a lower region of the opening; and (e) wherein the torque tube is rotated to cause the door to move from a closed position to an open position in which the latch assembly, the hinge guide assembly, and the frame guide assembly cause the upper edge of the door to initially move inward and downward relative to the body opening while the lower door edge initially moves outward and downward relative to the body opening.

2. A door assembly formed according to claim 1, further comprising a locking mechanism for steadying the door in its open position.

3. A door assembly formed according to claim 2, wherein the locking mechanism includes a lock surface connected to at least one hinge arm distal end and a lock pawl rotatably connected to the door structure near the lock surface; wherein rotation of the door to an open position causes the lock pawl to engage the lock surface.

4. A door assembly formed according to claim 1, wherein the at least one hinge arm is formed as two spaced-apart gooseneck hinge arms interconnected via an upper shoulder.

5. A door assembly formed according to claim 4, further comprising a snubber engaged with the hinge arms to control the rate of door movement.

6. A door assembly formed according to claim 1, further comprising a snubber engaged with the at least one hinge arm to control the rate of door movement.

7. A door assembly formed according to claim 1, further comprising a vent door; wherein the vent door and handle are integrally formed so that rotation of the handle causes direct like rotation of the vent door.

8. A door assembly formed according to claim 1, wherein the latching assembly biases the door in a closed position.

9. A door assembly formed according to claim 1, wherein the latching assembly includes two latch rollers and two latch tracks, one latch roller connected to each end of the torque tube and engageable with one latch track.

10. A door assembly formed according to claim 9, wherein the at least one hinge arm includes two gooseneck hinge arms; and the door includes a second mounting panel, the two mounting panels being located between the two gooseneck hinge arms with the handle being located between the two mounting panels.

11. A door assembly formed according to claim 10, wherein the hinge guide assembly includes two mounting rollers one extending from each mounting panel toward the opposite roller, and two hinge guide tracks located on the hinge arms, one track being adjacent each mounting roller.

12. A door assembly formed according to claim 11, wherein the hinge guide track includes a lateral portion followed by an upright portion, whereby movement of the mounting rollers in the tracks causes the door upper edge to first move inward and then downward.

13. A door assembly formed according to claim 1, wherein the frame guide assembly includes two frame guide rollers engageable with two body tracks.

14. A door assembly formed according to claim 1, wherein the frame guide assembly body track includes an upright portion followed by a diagonal portion, whereby movement of the frame guide roller causes the door lower edge to first downward and then down and outward.

15. A door assembly for covering an opening formed in a body of an aircraft, the door assembly comprising:

(a) a door formed of a number of interconnected structural members; two gooseneck hinge arms rotatably connected at their arcuate proximate ends to the aircraft body above the door opening and rotatably connected at their other distal ends to the door, two mounting panels located between the two gooseneck hinge arms; at least one actuator interconnected between the aircraft body and at least one gooseneck hinge arm, the at least one actuator to pivot the arm about its rotatable connection to the aircraft body; and a torque tube supported by the door and rotatable via an interior door handle located between the two mounting panels;

(b) a latching assembly including two latch rollers and two latch tracks located in the aircraft body as the opening, one latch roller connected to each end of the torque tube and engageable with one latch track the latch assembly biasing the door in a closed position;

(c) a hinge guide assembly including two mounting rollers connected to the mounting panel and engageable with hinge guide tracks located on each gooseneck hinge arm between their proximate and distal ends; each hinge guide track including a lateral portion followed by an upright portion, whereby movement of the mounting rollers in the tracks causes the door upper edge to first move inward and then downward;

(d) a frame guide assembly including two frame guide rollers connected to the door frame and engageable with corresponding body tracks located in the aircraft body at a lower region of the opening; the frame guide assembly body track including an upright portion followed by a diagonal portion, whereby movement of the frame guide roller causes the door lower edge to first move downward and then move down and outward; and (e) wherein the torque tube is rotated to cause the door to move from a closed position to an open position in which the shape and orientation of the latch assembly, the hinge guide assembly, and the frame guide assembly cause the upper edge of the door to initially move inward and downward relative to the body opening while the lower door edge initially moves outward relative to the body opening.

16. A door assembly formed according to claim 15, further comprising a locking mechanism for steadying the door in its open position, wherein the locking mechanism includes a lock surface connected to the at least one gooseneck hinge arm distal end and a lock pawl rotatably connected to the door near the lock surface; wherein rotation of the door to an open position causes the lock pawl to engage the lock surface.

17. A door assembly formed according to claim 15, further comprising a shoulder interconnecting portions of the gooseneck hinge arms, wherein a snubber is connected to one of the gooseneck hinge arms and the shoulder to control the rate of door movement.

18. A door assembly formed according to claim 15, further comprising a vent door; wherein the vent door and handle are integrally formed so that rotation of the handle causes direct like rotation of the vent door.

* * * * *